United States Patent [19]
Park et al.

[11] Patent Number: 6,101,825
[45] Date of Patent: Aug. 15, 2000

[54] REFRIGERATOR HAVING A DEVICE FOR OPENING/CLOSING COOL AIR SUPPLY PORTS AND METHOD FOR CONTROLLING THE SAME

[75] Inventors: Hae-jin Park, Suwon; Jae-in Kim, Seoul, both of Rep. of Korea

[73] Assignee: Samsung Electronics Co., Ltd., Suwon, Rep. of Korea

[21] Appl. No.: 09/084,888

[22] Filed: May 28, 1998

[30] Foreign Application Priority Data

Jul. 31, 1997 [KR] Rep. of Korea ............. 97-36293

[51] Int. Cl.[7] .................................... F25D 17/08
[52] U.S. Cl. ........................ 62/186; 62/208; 62/408
[58] Field of Search ........................ 62/186, 187, 407, 62/408, 208, 209

[56] References Cited

U.S. PATENT DOCUMENTS

| | | | |
|---|---|---|---|
| 4,879,503 | 11/1989 | Aoki et al. | 318/809 |
| 5,172,566 | 12/1992 | Jung et al. | 62/186 |
| 5,201,888 | 4/1993 | Beach, Jr. et al. | 62/187 |
| 5,650,697 | 7/1997 | Imagi et al. | 318/254 |
| 5,816,061 | 10/1998 | Lee et al. | 62/187 |

FOREIGN PATENT DOCUMENTS

| | | |
|---|---|---|
| 0 592 003 | 4/1994 | European Pat. Off. . |
| 9-133448 | 5/1997 | Japan . |
| 2 201 014 | 8/1988 | United Kingdom . |

Primary Examiner—Harry B. Tanner
Attorney, Agent, or Firm—Burns, Doane, Swecker & Mathis, L.L.P.

[57] ABSTRACT

A refrigerator having a device for opening/closing cool air supply ports is disclosed. The refrigerator has a sensor for sensing temperature in a cooling compartment, a motor for driving the device, and a control part for controlling the motor so that an open degree of the cool air supply ports are controlled by the device on the basis of the temperature difference between the sensed temperature and a standard temperature. Since the open degree of the cool air supply ports is controlled according to the standard temperature and the real temperature of the cooling compartment, the temperature of the cooling compartment is exactly controlled.

1 Claim, 6 Drawing Sheets

REFRIGERATOR HAVING A DEVICE FOR OPENING/CLOSING COOL AIR SUPPLY PORTS AND METHOD FOR CONTROLLING THE SAME

BACKGROUND OF THE INVENTION

1. Field of the Invention

The present invention relates to a refrigerator, and more particularly, to a refrigerator having an opening/closing device for controlling supply of cool air into a cooling compartment by opening/closing cool air supply ports.

2. Related Art

A general refrigerator has a compressor for compressing refrigerant, an evaporator for generating cool air by evaporating the refrigerant supplied from the compressor, and a fan for blowing the cool air generated by the evaporator. The cool air blown by the fan is supplied into a cool air duct formed with a plurality of cool air supply ports, and then the cool air is supplied into the cooling compartment through the cool air supply ports.

In order to control the supply of the cool air into the cooling compartment, a refrigerator having a device for opening/closing cool air supply ports has been proposed. FIG. 1 is a block diagram of a control device for controlling the refrigerator having such an opening/closing device.

The refrigerator has a temperature sensing part 30 having a first temperature sensor 31 and a second temperature sensor 32, a driving part 10 for driving the opening/closing device, and a microcomputer 20 for controlling the driving part 10 according to the sensing result of the temperature sensing part 30.

The driving part 10 is comprised of a driving motor 17 for driving the opening/closing device, a relay 11 for controlling supply of an alternating current from an external power source AC, and a reed switch 12 for sensing the status of the opening/closing device.

The opening/closing device of the refrigerator is comprised of, as shown in FIGS. 2 and 3, a duct member 13 being formed with a plurality of cool air supply ports 13a and forming a cool air duct into which the cool air flows from the evaporator, an opening/closing member 16 being closely contacted with the duct member 13 and for opening/closing the cool air supply ports 13a, and a power transmission 18 for transmitting the driving force of the driving motor 17.

A plurality of air holes 16a are formed on the opening/closing member 16. According to the position of the opening/closing member 16, the cool air supply ports 13a of the duct member 13 are opened as shown in FIG. 2 or closed as shown in FIG. 3.

The power transmission 18 is comprised of a cam and a plurality of gears, and converts the rotation of the driving motor 17 to the up-and-down movement of the opening/closing member 16. The reed switch 12 is installed on an area of the power transmission 18, and a magnet 19 for driving the reed switch 12 is mounted on an area of the opening/closing member 16. When the opening/closing member 16 moves down by the operation of the driving motor 17, the cool air supply ports 13a are closed as shown in FIG. 3, and the reed switch is turned on by the magnet 19. Then, the microcomputer 20 senses the completion of the closing operation of the opening/closing member 16, and stops operating the driving motor 17.

As such, the refrigerator drives the opening/closing member on the basis of the temperature sensed by the temperature sensing part 30, whereby the cool air is supplied into the cooling compartment or the supply of cool air is stopped, and the temperature of the cooling compartment is maintained constant. Further, the refrigerator has a sensor for sensing the open/close states of the door mounted on the cooling compartment, and when the open state of the door is sensed by the sensor, the driving motor 17 is driven so that the cool air supply ports 13a are closed by the opening/closing member 16. Therefore, when the door is open, the supply of the cool air to the cooling compartment is stopped, the loss of the cool air caused by the unnecessary supply of the cool air is prevented.

However, in such a conventional refrigerator, the opening/closing member 16 merely performs the operations for opening/closing the cool air supply ports 13a, so there is a shortcoming that the supply of the cool air is not efficiently controlled. Furthermore, since some period of time is consumed in closing the cool air supply ports 13a by driving the opening/closing member 16 using the driving motor 17, the supply of the cool air is not stopped immediately after the door is opened, and thereby the loss of the cool air occurs.

SUMMARY OF THE INVENTION

The present invention has been proposed to overcome the above described problems in the prior art, and accordingly it is the object of the present invention to provide a refrigerator having a device for opening/closing cool air supply ports, which is capable of finely controlling the supplying amount of cool air by controlling the open degree of the cool air discharge ports, and rapidly closing the cool air supply ports when the door is opened.

To achieve the above object, the present invention provides a refrigerator having a device for opening/closing cool air supply ports, the device for controlling supply of cool air into a cooling compartment, the refrigerator comprising: a means for sensing a temperature in the cooling compartment; a motor for driving the opening/closing device; and a control part for controlling the motor so that an open degree of the cool air supply ports is controlled by the opening/closing device on the basis of a temperature difference between a standard temperature of the cooling compartment and a sensed temperature of the cooling compartment sensed by the temperature sensing means, Here, the control part comprises: a zero-crossing detector for detecting zero-crossing time points of an alternating current supplied to the motor; a triac for controlling supply of the alternating current to the motor; and a microcomputer for turning the triac on according to the number of input pulses inputted thereto from the zero-crossing detector, the number which corresponds to a time required for operating the motor.

Furthermore, according to the present invention, a method for controlling opening/closing operations of a device for opening/closing cool air supply ports in a refrigerator, the device for controlling supply of cool air into a cooling compartment, is provided, which comprises the steps of: sensing a temperature in the cooling compartment calculating a temperature difference between a standard temperature of a cooling compartment and a sensed temperature of the cooling compartment; calculating an open degree of the cool air supply ports by the opening/closing device on the basis of the temperature difference; and performing opening/closing operation of the cool air supply ports by the opening/closing device according to the calculated open degree.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Figure 1:
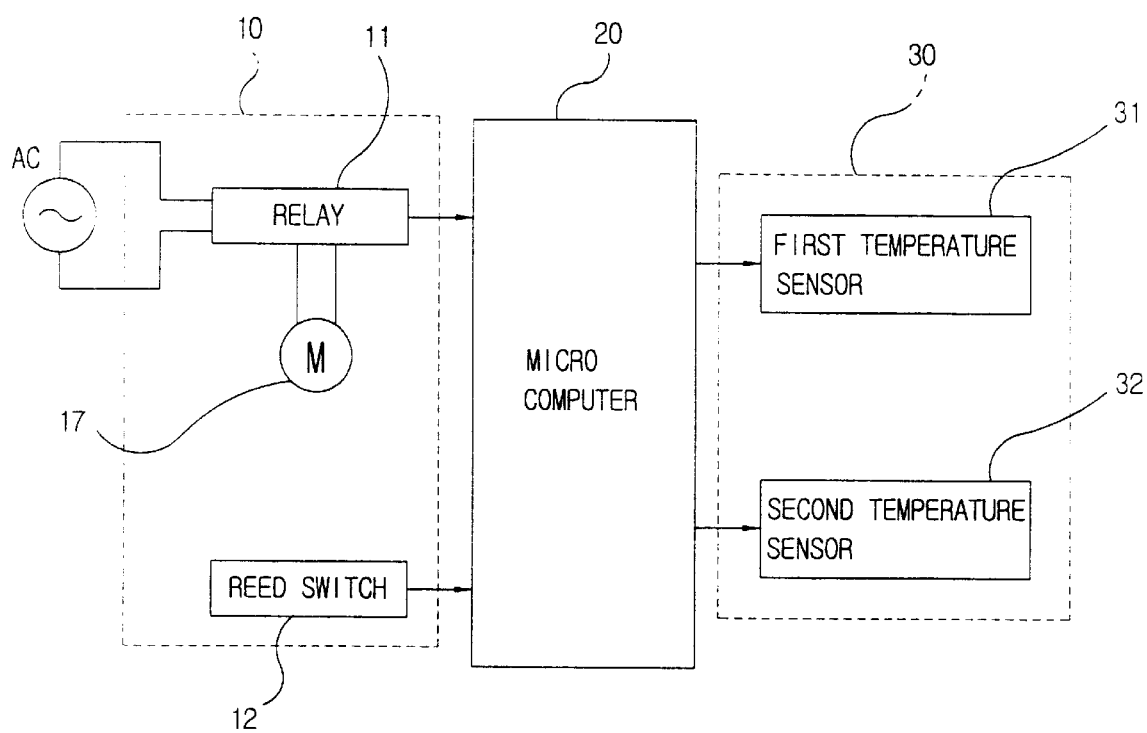
FIG. 1 is a block diagram of a conventional opening/closing device of a refrigerator.
Figure 2:
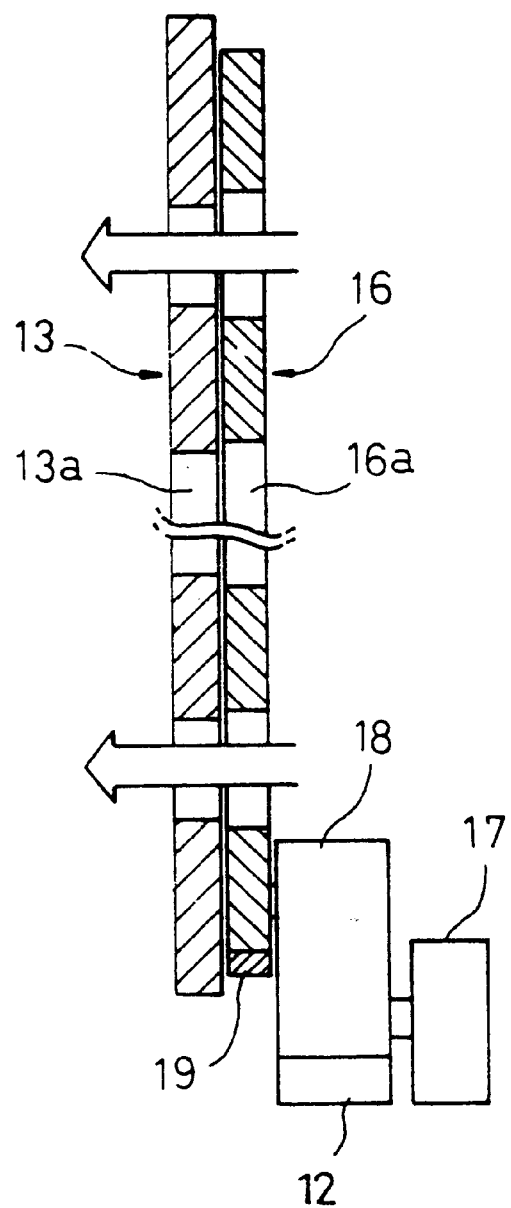
FIGS. 2 and 3 is a side sectional view of a conventional opening/closing device.
Figure 3:
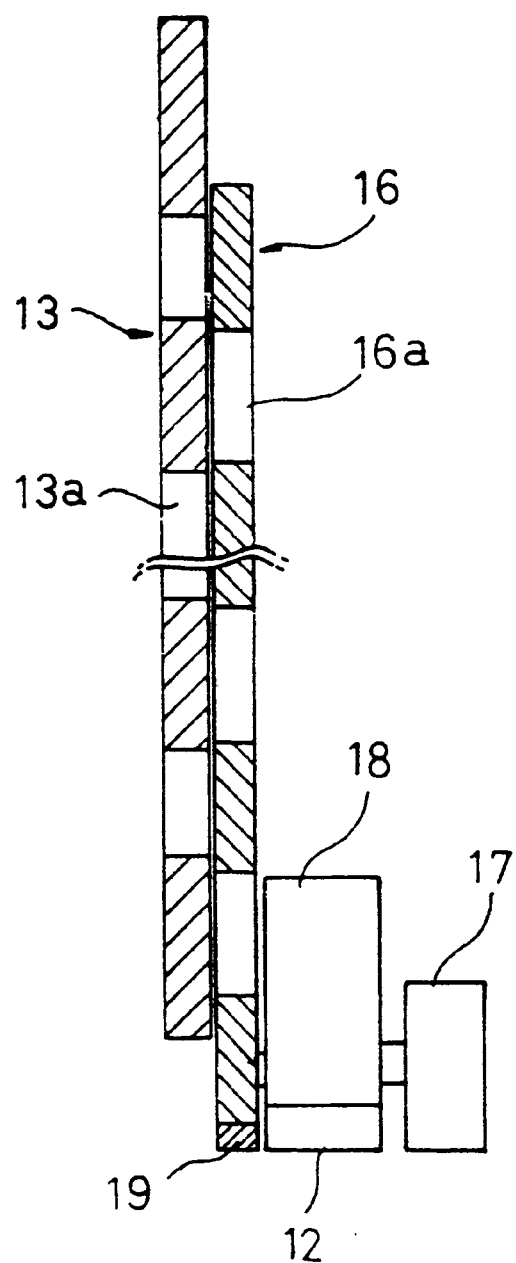

Hereinafter, the present invention will be described in detail with reference to the drawings. The duct member 13 and the opening/closing member 16 shown in FIGS. 2 and 3 are not shown and not illustrated, and will be referred to with the same reference numerals.

Figure 4:
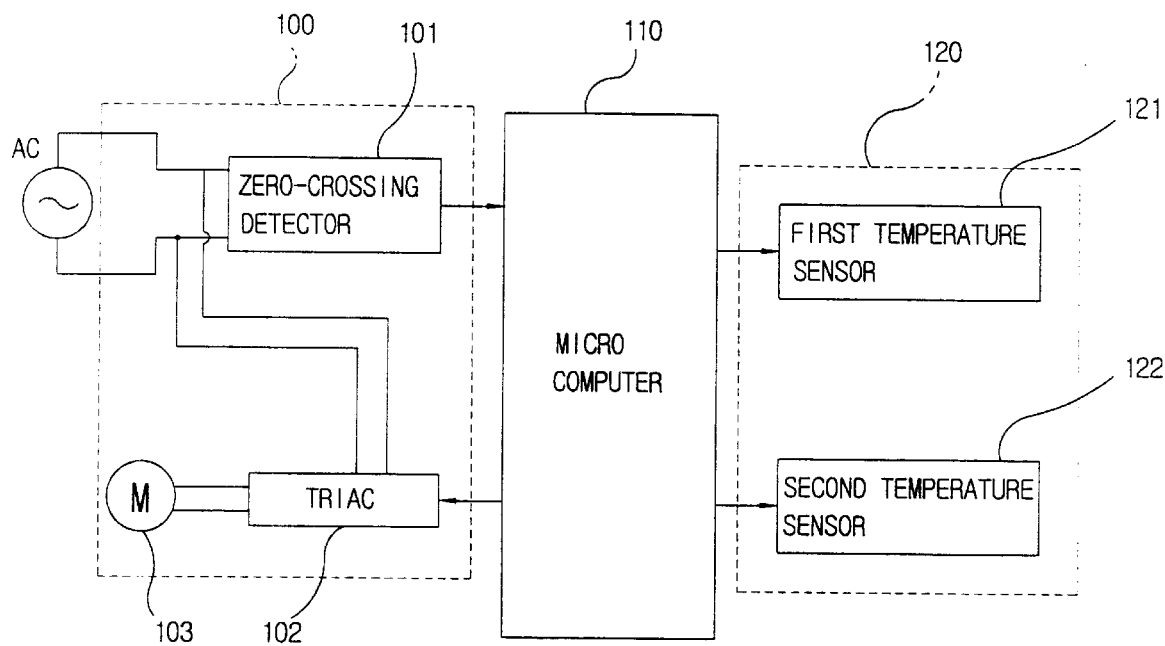
FIG. 4 is a block diagram of an opening/closing member according to the present invention.

FIG. 4 is a block diagram of an opening/closing member according to the present invention;

The refrigerator has a temperature sensing part 120 for sensing the temperature in the cooling compartment, a driving part 100 for driving the opening/closing member 16, and a microcomputer 110 for controlling the driving part 100 on the basis of the sensing result of the temperature sensing part 120.

The temperature sensing part 120 includes a first temperature sensor 121 and a second temperature sensor 122.

The driving part 100 is comprised of a zero-crossing detector 101 for detecting the zero-crossing time points of the alternating current supplied from the external power supply AC, a driving motor 103 for driving the opening/closing member 16, and a triac 102 for controlling the supply of the alternating current from the external power supply AC to the driving motor 103.

Figure 5:
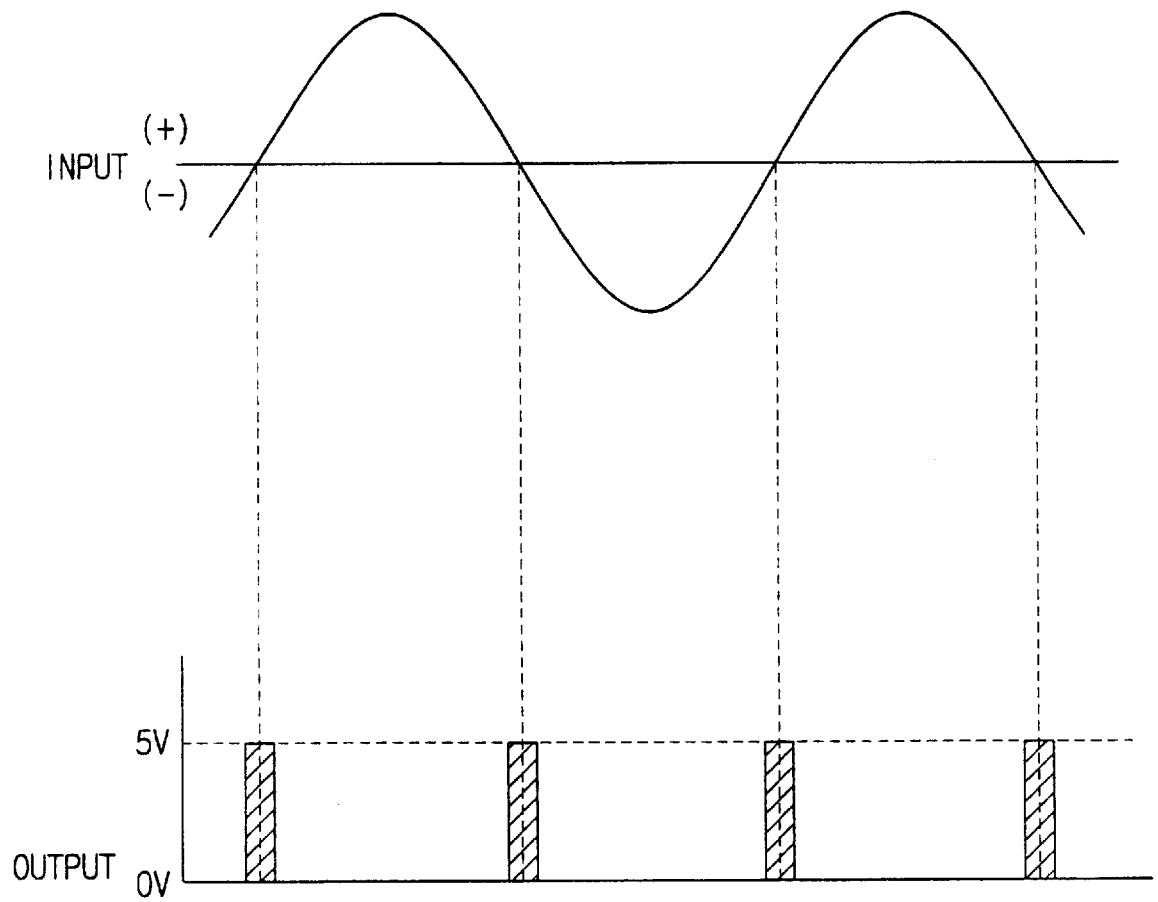
FIG. 5 is a graph showing an input and an output of the zero-crossing detector shown in FIG. 4.

FIG. 5 shows the input and the output of the zero-crossing detector 101. The alternating current from the external power supply AC is supplied to the zero-crossing detector 101, and the zero-crossing detector 101 detects the zero-crossing time points of the alternating current and generates pulses at the detected time points. The pulses generated from the zero-crossing detector 101 is inputted into the microcomputer 110.

The triac 102 drives the driving motor 103 according to the control of the microcomputer 110. That is, when the triac 102 is turned on by the microcomputer 110, the alternating current is supplied into the driving motor 103 from the power supply AC, and when the triac 102 is turned off, the supply of the alternating current is stopped.

Figure 6:
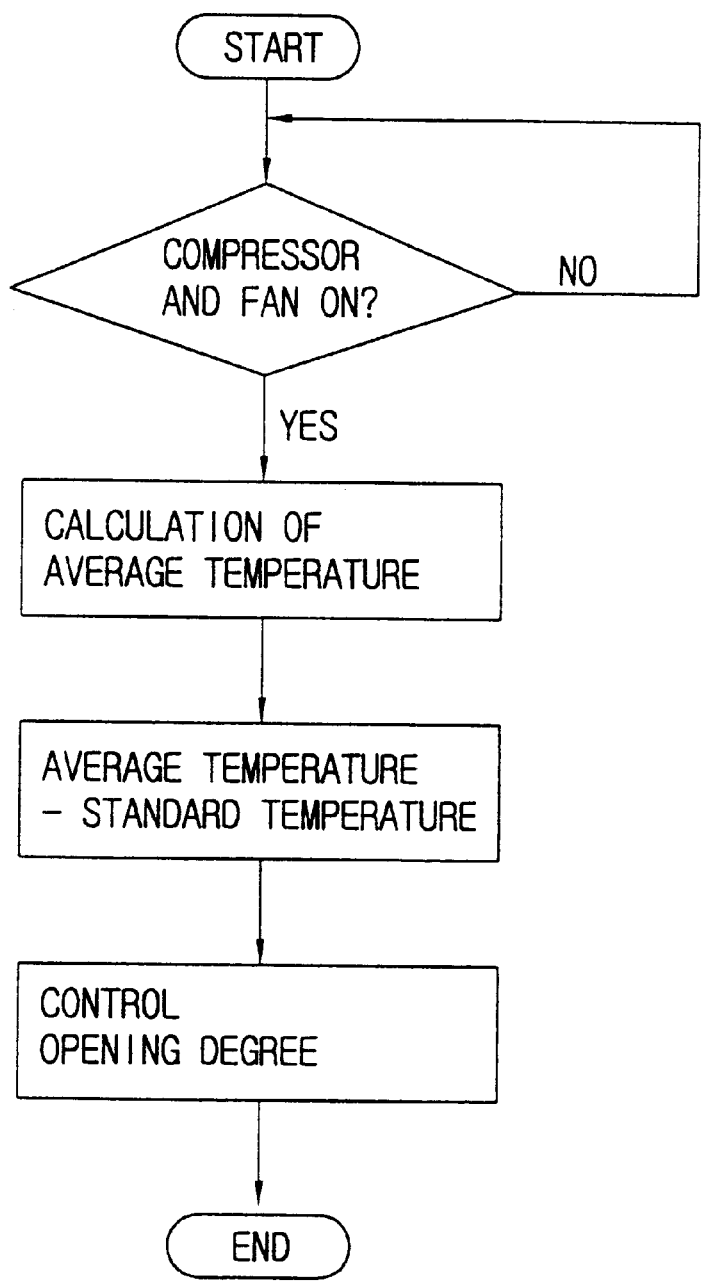
FIG. 6 is a flow chart showing the method for controlling the opening/closing operation according to the present invention.

FIG. 6 is a flow chart showing the method for controlling the opening/closing operation according to the present invention.

First, the refrigerator judges S1 whether the compressor and the fan are operating or not and thereby whether the cool air is being generated or not. If the cool air is being generated, the microcomputer 110 calculates S2 the average temperature of the inside of in the cooling compartment on the basis of the temperatures sensed by the first and the second temperature sensors 121 and 122.

In the refrigerator, a desirable cooling intensity is pre-set by a user, and in the microcomputer 110, a standard temperature corresponding to the cooling intensity set by the user is pre-programmed. The microcomputer 110 calculates S3 the difference between the calculated average temperature and the standard corresponding to the set cooling intensity. The microcomputer 110 controls S4 the open degree of the cool air supply ports 13a on the basis of the calculated temperature difference. The detailed process for the operation of controlling the open degree is as follows.

The microcomputer 110 calculates the required open degree of the cool air supply ports 13a on the basis of the temperature difference. The microcomputer 110 turns on the triac 102 according to the number of the pulses inputted from the zero-crossing detector 101, which corresponds to the required driving time of the driving motor 103 so that the cool air discharge ports 13a are opened to a calculated open degree.

For example, if the driving motor 103 is rotated at a rotational velocity of 6 rpm, and if the driving motor 103 should be rotated at 36 degrees in order to open the cool air discharge ports 13a to the calculated open degree, the alternating current should be supplied to the driving motor 103 for one second. If the external power supply AC provides the driving motor 103 with a common house alternating current of 60 Hz, one second corresponds to the sixty output pulses of the zero-crossing detector 101. Therefore, the microprocessor 110 turns the triac 102 on while just the sixty pulses of the triac 102 are inputted to the microcomputer 110, and then the driving motor 103 rotates exactly 36 degrees. Then, the open degree of the cool air supply ports 13a is exactly controlled.

As described above, according to the present invention, since the supply amount of the cool air is varied according to the standard temperature and the real temperature of the cooling compartment, the temperature of the cooling compartment is exactly controlled. Furthermore, in conventional refrigerator, when the door is opened, the opening/closing member 16 is controlled from the total open state to the total close state in order to prevent loss of the cool air, however, according to the present invention, it is controlled from the state somewhat open to the close state, so the cool air supply ports 13a are rapidly closed. Therefore, the supply of the cool air is rapidly stopped when the door is opened, and the loss of the cool air caused by the unnecessary supply of the cool air is efficiently prevented.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A refrigerator having a device for opening/closing cool air supply ports, said device for controlling supply of cool air into a cooling compartment, said refrigerator comprising:

a plurality of temperature sensors installed in said cooling compartment for sensing a temperature in said cooling compartment;

a motor for driving said opening/closing device;

a zero-crossing detector for detecting zero-crossing time points of an alternating current supplied to said motor;

a triac for controlling supply of the alternating current to said motor; and a microcomputer for controlling said motor by turning said triac on according to the number of input pulses inputted thereto from said zero-crossing detector, the number of input pulses corresponding to a time required for operating said motor so that an open degree of the cool air supply ports is controlled by said opening/closing device at a predetermined degree which is calculated based on a temperature difference between a standard temperature of said cooling compartment and an average value of temperature of said cooling compartment sensed by said temperature sensors.

* * * * *